United States Patent [19]
Greene

[11] Patent Number: 5,917,843
[45] Date of Patent: Jun. 29, 1999

[54] LASER CAVITY ASSEMBLY

[75] Inventor: Benny Allan Greene, Isaacs Australian Capital Territory, Australia

[73] Assignee: Electro Optic Systems Pty., New South Wales, Australia

[21] Appl. No.: 08/676,189

[22] PCT Filed: Dec. 29, 1994

[86] PCT No.: PCT/AU94/00794

§ 371 Date: Dec. 19, 1996

§ 102(e) Date: Dec. 19, 1996

[87] PCT Pub. No.: WO95/18478

PCT Pub. Date: Jul. 6, 1995

[30] Foreign Application Priority Data

Dec. 24, 1993 [AU] Australia ............................... PM 3162

[51] Int. Cl.⁶ ................................................. H01S 3/098
[52] U.S. Cl. ................................ 372/19; 372/16; 372/31; 372/25; 372/97; 372/23; 372/100; 372/22; 372/92; 372/10
[58] Field of Search .............................. 372/16, 93, 100, 372/92, 23, 97, 31, 25, 19, 22, 10

[56] References Cited

U.S. PATENT DOCUMENTS

| | | | |
|---|---|---|---|
| 3,860,888 | 1/1975 | Stephens | 372/16 |
| 4,408,334 | 10/1983 | Lundstrom | 372/93 |
| 4,420,836 | 12/1983 | Harper | 372/93 |
| 4,525,034 | 6/1985 | Simmons | 372/16 |
| 4,564,949 | 1/1986 | Trolinger | 372/93 |
| 4,660,204 | 4/1987 | Dewhirst | 372/16 |
| 4,675,500 | 6/1987 | Kunz et al. | 372/16 |
| 4,677,639 | 6/1987 | Sasser | 372/100 |
| 4,740,986 | 4/1988 | Reeder | 372/93 |
| 4,751,720 | 6/1988 | Koop | 372/93 |
| 4,809,282 | 2/1989 | Dewhrist | 372/16 |

OTHER PUBLICATIONS

Bethea; "Megawatt Power at $1.318\mu$ in Nd:YAG and Simultaneous Oscillation at Both 1.06 and $1.318\mu$"; IEEE Jour. Quantum Elect.;Feb,1993.

*Primary Examiner*—Leon Scott, Jr.
*Attorney, Agent, or Firm*—Knobbe, Martens, Olson & Bear, LLP

[57] ABSTRACT

A laser cavity assembly includes means (12, 13, 14; 14", 56, 57) defining respective optical resonance cavities (20, 22) for stimulated radiation of different wavelengths, which cavities include at least some common volume. Such means includes window means (13, 14) for emission of radiation amplified in the respective cavities. Means (15, 54) in one of said cavities is responsive to stimulated radiation emitted by a laser medium at one of the wavelengths to emit radiation at another of the wavelengths. Dual mode means (12, 54) has respective selectable first and second modes at which the laser cavity assembly is adapted to emit laser radiation predominantly at the respective wavelengths. Also disclosed are a novel Q-switch device and a combination laser oscillator and dual mode means.

34 Claims, 4 Drawing Sheets

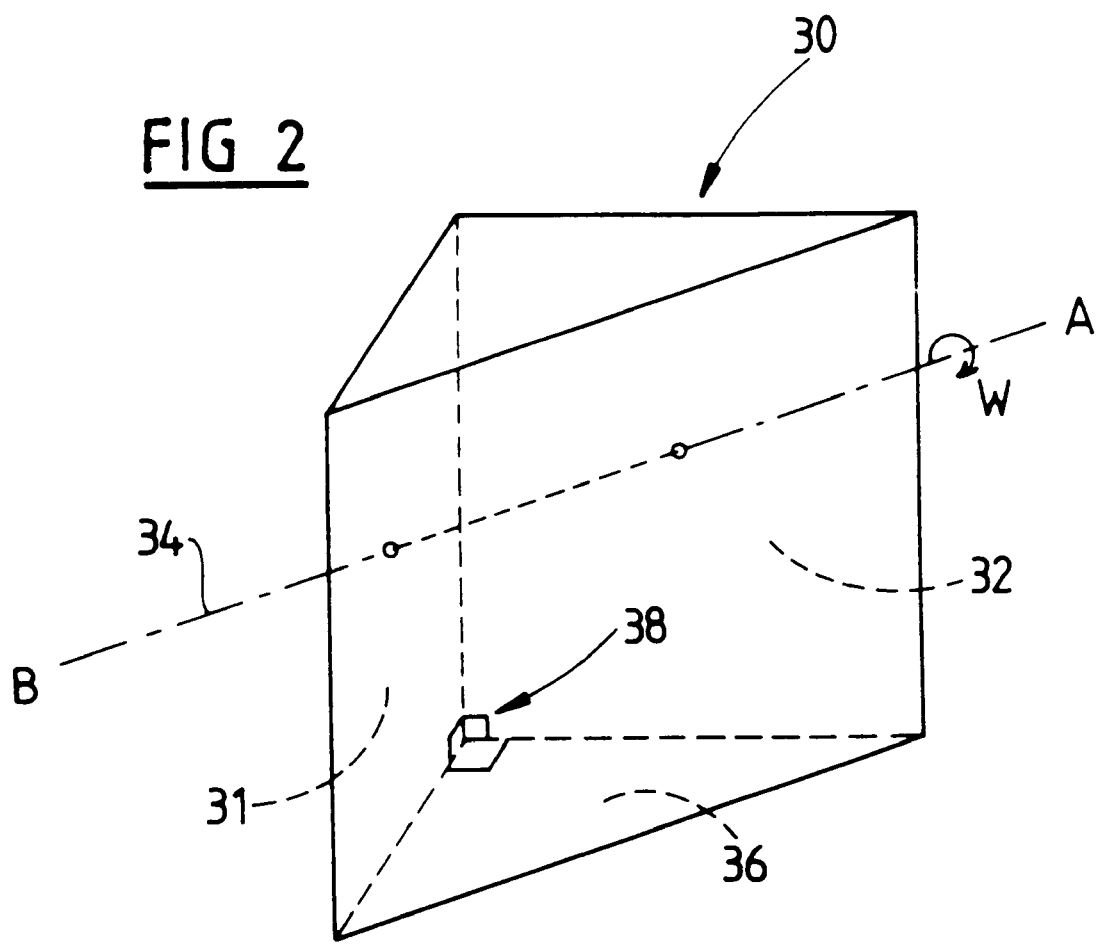

LASER CAVITY ASSEMBLY

FIELD OF THE INVENTION

This invention relates to a laser cavity assembly adapted to emit at more than one wavelength. In other aspects, the invention is concerned with a novel Q-switch device and with a combination laser oscillator and dual mode means.

BACKGROUND ART

Nd:YAG lasers operating at 1.06 μm wavelength are very well known. These lasers have been deployed in a wide range of applications.

More recently, there has been considerable interest in lasers operating with output around 1.5 μm wavelength, because the eye is far less susceptible to damage at this wavelength. These lasers are often referred to as eyesafe lasers, and generally they are either based on Erbium doped glass or YAG (operating fundamentally at around 1.5 μm), or rely on parametric or other conversion from a different fundamental wavelength. For example, eyesafe lasers based upon Nd:YAG lasers and conversion from 1.06 to 1.5 μm by Raman or OPO (optical parametric oscillator) are known.

Many sensors in military and other applications operate only at 1.06 μm, and replacement of the laser source is inhibited by the prohibitive cost of replacing all sensors. For example, laser guided weapons exist in large stockpiles with systems configured for 1.06 μm. However, the operational platforms which designate targets for these weapons require eyesafe lasers for new applications. Often there are space, eight, and maintenance considerations mitigating against proliferation of laser sources on forward-deployed platforms. Nevertheless, systems are now being provided with separate lasers for different parts of the system, for example 1.06 μm lasers for the laser designator components, and 1.51 μm lasers for the range finders.

DISCLOSURE OF THE INVENTION

It is therefore an object of the invention, in at least a first aspect, to provide a single configuration which is adaptable to selectably generate radiation at two or more different wavelengths.

To meet this object, the invention provides, in a first aspect, a laser cavity assembly comprising:

means defining respective optical resonance cavities for stimulated radiation of different wavelengths, which cavities include at least some common volume, such means including window means for emission of radiation amplified in the respective cavities, means in one of said cavities responsive to stimulated radiation emitted by a laser medium at one of said wavelengths to emit radiation at another of said wavelengths; and dual mode means having respective selectable first and second modes at which the laser cavity assembly is adapted to emit laser radiation predominantly at the respective wavelengths.

In one embodiment, the responsive means is responsive to stimulated radiation emitted by a laser medium at one of said wavelengths having one or more prescribed characteristics to emit radiation at another of said wavelengths, and wherein in the respective first and second modes of said dual mode means, radiation of said one wavelength respectively possesses and does not possess said prescribed characteristic. The prescribed characteristic may advantageously be a particular range of intensity of stimulated radiation.

The means defining the respective cavities may include the dual mode means, which may define an end mirror for each cavity. In the latter case, the dual mode means may comprise a device configured whereby, in one of said modes, the dual mode means comprises Q-switch means. For example, the end mirror may be a rotatable Porro prism having respective selectable modes. The prism may be rotatable as a conventional Q-switch in said first mode, whereby the prescribed characteristic of said radiation is short pulse/high intensity. In the second mode, the prism is configured to be retro-reflective and thereby to generate long pulse/low intensity radiation at said one wavelength.

In another embodiment, the dual mode means comprises an optical switch including a fully reflecting portion and a partially reflecting portion, which switch is selectively operable to alternate said portions between adjacent optical paths to define said respective cavities between the fully reflecting portion and said window means via retroreflecting means. In this case, the window means may comprise a beam mixer arranged to emit stimulated radiation of the respective wavelengths received on the respective optical paths.

Conveniently, to form a fully operational laser assembly, at least one of said cavities and preferably the common volume, is provided with a laser medium, for example having a fundamental emission wavelength of 1.06 μm. A suitable medium for this purpose is Nd:YAG. A complete laser would of course include means for pumping the laser medium.

The radiation responsive means may be an optical parametric oscillator. Typically, the active material of such an oscillator will have a threshold intensity for incoming radiation, below which conversion to the other wavelength will essentially not occur. Thus, as already indicated, the prescribed characteristic may be its intensity, which relates in turn to pulse length.

Other possible forms of the dual mode means include a Pockels cell Q-switch, mode locking means, and cavity dump means. In the former case, the device can be adapted to the inventive assembly by providing a selectable continuous ON mode in addition to the normal ON/OFF mode. In the case of a mode locker, adaptation would require the addition of a selectable OFF mode.

The assembly may further include detector means for detecting returned reflected or scattered radiation, and partially reflecting means to direct such returned radiation to the detector means after it has traversed said radiation responsive means.

In its second aspect, the invention provides a Q-switch device for laser systems comprising a prism mounted for rotation about an axis intersecting respective mutually orthogonal faces of the prism, wherein said prism includes retroflective means, preferably a third face which is orthogonal to each of said mutually orthogonal faces, whereby to define an internal retro-reflective corner in said prism.

This Q-switch device further includes means to alter the orientation of the prism with respect to an optically resonant cavity whereby, selectively, the amplified radiation generated in the cavity is momentarily reflected from the aforementioned mutually orthogonal faces as a short pulse/high intensity Q-switch mode, or is reflected by said retro-reflective corner as a long pulse/low intensity mode.

The invention, further provides, in a third aspect, in combination, a laser oscillator and dual mode means having respective selectable first and second modes at which radiation at a wavelength respectively possesses and does not possess a prescribed characteristic(s), and amplifier means operable to modify the output of the laser source to alter the output between said modes.

BRIEF DESCRIPTION OF THE DRAWINGS

The invention, in both of the above aspects, will now be further described, by way of example only, with reference to the accompanying drawings, in which:

FIG. 2 is a diagram of a Q-switch modified Porro prism according to an embodiment of a second aspect of the invention, and adapted to serve as the end mirror of FIG. 1;

EMBODIMENTS OF THE INVENTION

Figure 1:
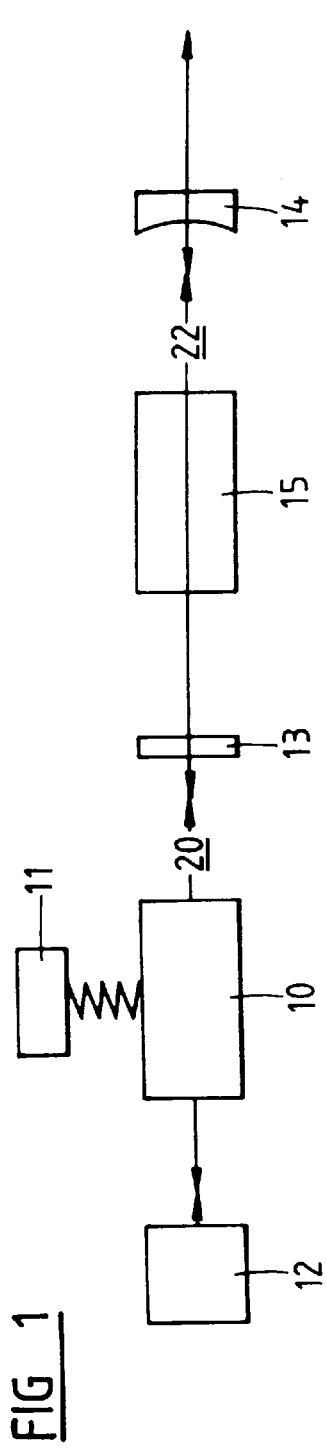
FIG. 1 is a simple diagrammatic representation of a laser configuration incorporating a laser cavity assembly according to an embodiment of the first aspect of the invention.

The laser configuration illustrated in FIG. 1 includes a laser medium 10 in the form of a Nd:YAG rod or slab which in operation is pumped by a flash lamp or laser diode pump 11. The Nd:YAG medium has a fundamental laser emission wavelength of 1.06 $\mu$m. A first optical resonance cavity 20 incorporating medium 10 is defined by an end mirror 12, arranged so that its optical losses can be externally controlled, and by a window 13 which is partially reflecting at 1.06 $\mu$m but highly reflective at around 1.5 $\mu$m. A second optical resonance cavity 22 is defined between end mirror 12 and a more distant window 14 which is partially reflecting at 1.5 $\mu$m. An optical parametric oscillator (OPO) 15 located between windows 13,14, is designed to convert 1.06 $\mu$m radiation to 1.54 $\mu$m radiation under the appropriate conditions. These components are of course housed within a suitable casing, which is not shown for convenience of illustration.

The reactive medium of optical parametric oscillator 15 has a threshold intensity for incoming 1.06 $\mu$m radiation, below which conversion to 1.5 $\mu$m will essentially not occur. If the OPO material and the intra-cavity optics are appropriately selected, this threshold will lie between two discrete operating domains of the Nd:YAG laser—a long pulse/low intensity mode, and a short pulse/high intensity or Q-switch mode. In practice, this is not difficult to arrange since there are typically three orders of magnitude difference between these intensities.

Switching between the modes is achieved by providing end mirror 12 in the form of dual mode means having selectable first and second modes as just outlined. Then, if the laser configuration is operated in long pulse/low intensity mode, oscillator 15 will transmit the 1.06 $\mu$m beam which will have high energy but low intensity. If the laser is operated in Q-switch, or other short pulse/high intensity mode such as cavity dump or mode locked, the oscillator 15 will convert a large proportion of the 1.06 $\mu$m laser output to 1.5 $\mu$m output, which will then be amplified in cavity 22 and emitted at window 14.

In general, by holding the optical loss of end mirror 12 low for a long period, the long pulse mode is achieved. If the optical loss of end mirror 12 is held high and suddenly reduced to near zero (Q-switch) the alternative mode will apply. The configuration thus meets a general requirement for a dual wavelength dual mode laser configuration.

One possible form of dual mode end mirror 12 is a combination of end mirror and electro-optical modulator, for example a Pockels cell. This configuration allows electronic selection of the output mode, by electronics control of the Pockels cell losses. A Pockel's cell Q-switch, or other EO Q-switch, is especially useful for dual wavelength applications where the 1.06 $\mu$m mode needs to be very precisely controlled in time. For more general applications, it is thought that a more advantageous Q-switch form of end mirror 12 is a modified Porro prism in accordance with FIGS. 2 to 4. This arrangement has advantages over the Pockels cell embodiment in that it is less expensive, less bulky (because the Pockels cell arrangement requires additional gain length to compensate for its inherent optical lossiness), and in general can achieve a substantially smaller size.

The conventional Porro prism has two working faces arranged mutually orthogonally and typically rotates about an axis intersecting these faces. When these faces are momentarily correctly aligned with respect to the output window, an optically resonant cavity momentarily exists and a short pulse/high intensity emission results. In accordance with an embodiment of the second aspect of the invention (FIG. 2), the prism 30 is provided with at least one third face 36 which is orthogonal to each of conventional orthogonal Porro faces 31,32 so as to form an internal corner-cube retro-reflector 38. If the prism is rotated to align the retro-reflector 38 rather than Porro faces 31,32 with respect to the output window, the laser can be fired in long pulse mode since a resonator utilising a retro-reflector is insensitive to misalignment and/or rotation of the retro-reflector. Thus, with the prism configuration depicted in FIG. 2, a laser can be operated in both long pulse and Q-switch modes, and in smaller, lighter and more reliable configurations than might otherwise be obtainable by other forms of dual mode end mirror 12.

Figure 4:
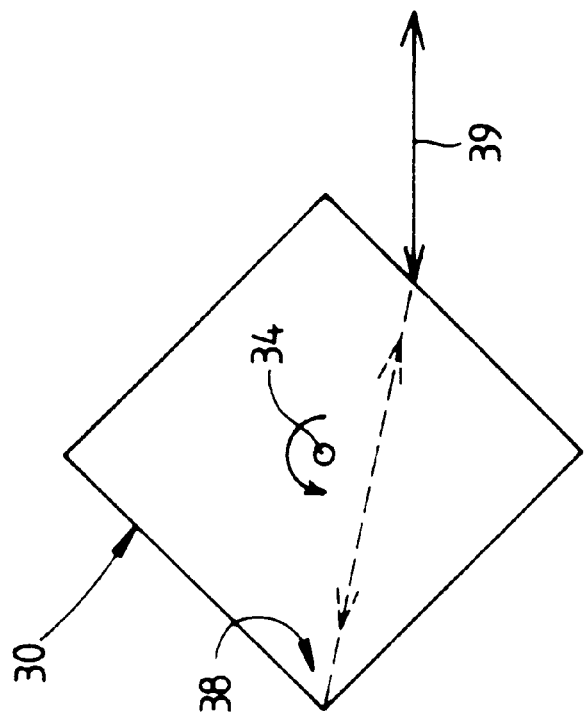
FIGS. 3 and 4 illustrate the two operating modes of the modified Porro prism.
Figure 3:
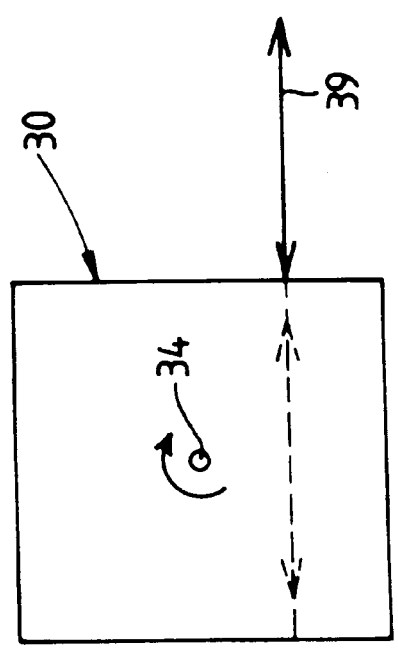

FIGS. 3 and 4 illustrate diagrammatically the two modal positions of the prism 30. The long pulse mode may be obtained by either "parking" the prism, with very coarse precision, at the aligned angle for retro-reflection, or by rotating the prism and firing the laser at the time of alignment relative to laser beam 39 as a retro-reflector (FIG. 4). The Q-switch mode is obtained conventionally, by high speed rotation about axis 34 intersecting Porro faces 31,32 (FIG. 3).

It is emphasised that a prism of the form exemplified by FIG. 2 is not limited in its applications to the configuration of FIG. 1. There are many other applications of this device as an alignment tool, optical switch or modulator.

It should be further noted, with reference to FIG. 1, that in practice it is not necessary to place the optical parametric oscillator 15 outside cavity 20. If the oscillator is relocated within cavity 20, it will act as a cavity dump mechanism after the Q-switch. The dual mode will still apply.

It is expected that the invention according to the second aspect of the invention will be particularly preferred as the dual mode means in the configuration according to the first aspect for laser materials with low or moderate gain, since other cavity Q spoiling techniques do not achieve the same "ON" efficiency as the illustrated modified Porro prism.

Figure 5:
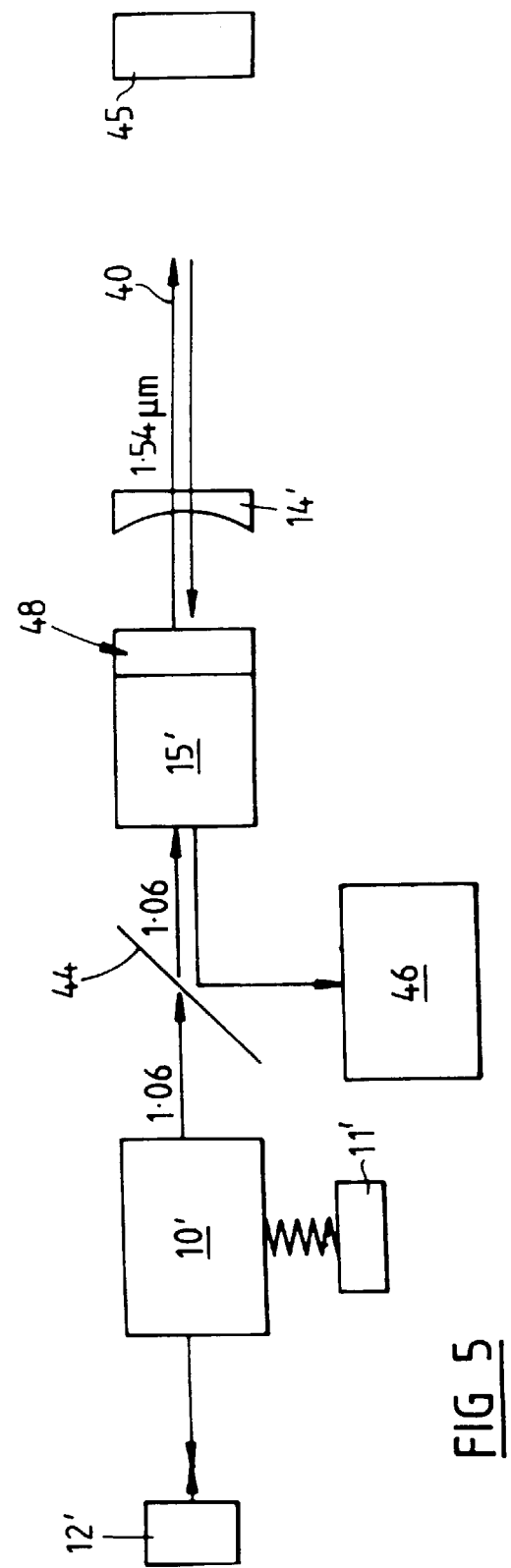
FIG. 5 illustrates a modification of the embodiment of FIG. 1, incorporating provision to receive a return signal.

FIG. 5 illustrates a modification of the arrangement of FIG. 1 incorporating provision to receive and detect a return signal, e.g. a return signal monitored for range determination in lidar equipment. Like components are indicated in FIG. 5 with like primed reference numerals.

In many applications, the return beam 42 reflected or scattered from a target 45 is very low in intensity (e.g. 4 to 10 orders of magnitude lower) compared to the outgoing beam 40. It is therefore well below the threshold for non-linear conversion at optical parametric oscillator 15'. Thus, it is feasible to employ the same aperture for transmit and receive: a low intensity 1.54 μm return beam 42 passes through OPO 15' without conversion back to 1.06 μm, and can be reflected with high efficiency at a partially reflecting angled mirror 44 to a 1.54 μm detector 46. It is believed that this configuration will perform satisfactorily for other frequency conversion crystals, e.g. a KDP frequency doubler.

Figure 7:
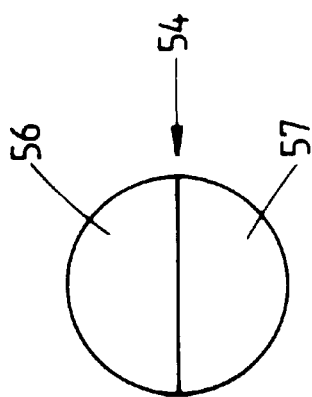
FIG. 7 is a front elevation of a switching component of the embodiment of FIG. 6.

In the embodiments of FIGS. 1 and 5, the conversion efficiency of optical parametric oscillator 15 is less than 100% and hence the 1.54 μm mode is typically contaminated with some 1.05 μm radiation. One simple approach is to switch in a 1.06 μm absorber or attenuator 48 between OPO 15 and window 14 (FIG. 5), or outside window 14. Another approach to achieving selective transmittal of uncontaminated 1.06 or 1.54 μm radiation is the alternative embodiment of FIGS. 6 and 7.

Figure 6:
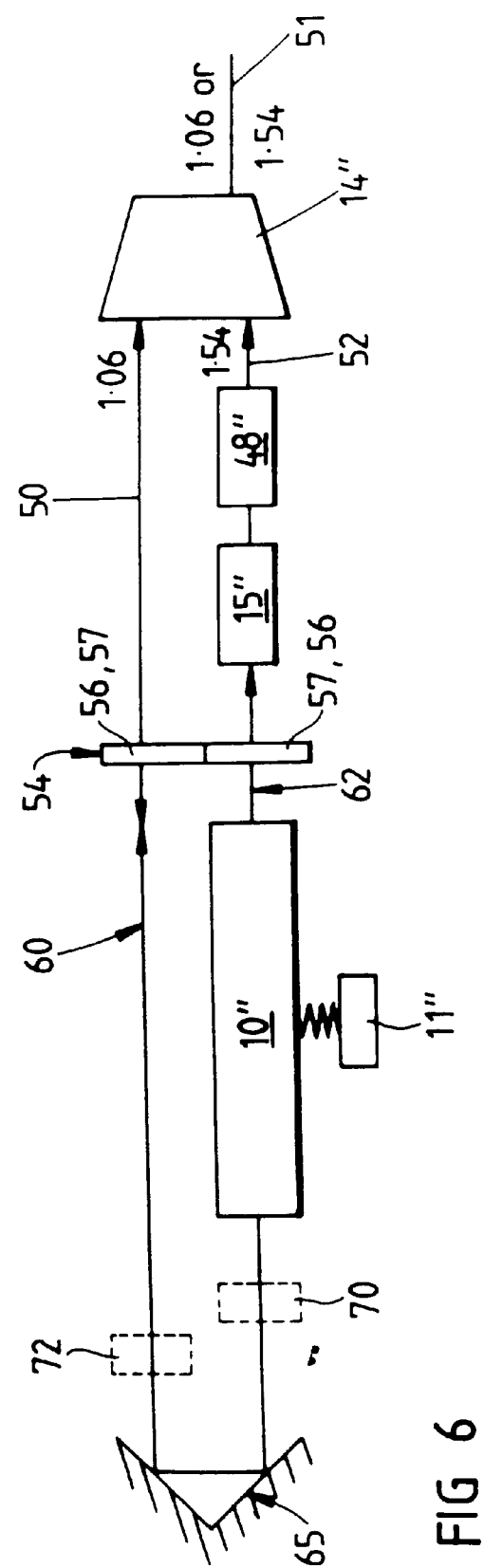
FIG. 6 is a simple diagrammatic representation of a still further embodiment of the invention.

In FIG. 6, like components are indicated by like double primed reference numerals. In this case, the output window 14" comprises a beam mixer, which might for example be simply two dichroic mirrors, arranged to selectively receive, and emit at 51, either a 1.06 μm laser beam 50 or a 1.54 μm laser beam 52, according to the position of dual mode means in the form of an optical switch 54. Switch 54 is of the form shown in FIG. 7: a rotatable disc which comprises two juxtaposed semicircular mirrors 56, 57. Mirror 56 is fully reflecting and mirror 57 is a partially transmitting window.

By rotating switch disc 54, mirrors 56, 57 can be selectively placed across a first optical path 60 to output window beam mixer 14" between Nd:YAG laser medium 10" and optical parametric oscillator 15", or across a second optical path 62 from the laser medium to the beam mixer, parallel to the first, defined by a retroreflector 65 on the opposite side of medium 10". When fully reflecting mirror 56 is "up", i.e. across path 62, and partially reflecting window 57 is "down", i.e. across path 62, a resonance cavity is defined between mirror 56 and beam mixer window 14" via retroreflector 65, OPO 15" and a 1.06 μm attenuator 48". The 1.06 μm fundamental laser emission of Nd:YAG medium 10" is converted to 1.54 μm, residual 1.06 μm radiation is substantially suppressed at attenuator 48", and a substantially uncontaminated 1.54 μm output is emitted at window 14". When the switch 54 is inverted, a different resonance cavity is defined between mirror 56 and beam mixer window 14" via retroreflector 65 and path 62, but excluding OPO 15, and thus a substantially pure 1.06 μm output emerges at window 14". It will be appreciated that, with the embodiment of FIG. 6, if one is working in eyesafe mode, there is no leakage of 1.06 μm to make the laser unsafe.

Where desired, the embodiment of FIG. 6 may be further modified by incorporation of a polariser and/or passive Q-switch at 70, and/or of a Pockel's Cell or other active Q switch at 72.

A further aspect of the invention will now be outlined. The aspect of the invention which allows output wavelength selection through control of the (pump) laser intensity, also allows dual wavelength short pulse lasers to be designed (of short and long pulse). In this case a laser oscillator can run at some repetition frequency $f_1$. An amplifier disposed between the oscillator and an optical parametric oscillator (OPO) is fired to synchronise with the laser oscillator, but at repetitive frequency $f_2$. Amplified pulses are wavelength converted at the OPO, whilst unamplified pulses are not.

For example, if $f_1=2f_2$, and the laser is a typical Nd:YAG oscillator/amplifier combination, then the output will alternate between:

5 μJ @1.06 μm

•5 mJ @1.54 μm

In practice $f_1$ is any multiple of $f_2$. The OPO coatings can be selected so that the 5 μJ @ 1.06 μm is omitted on every shot, as some 1.05 μm radiation is unconverted by the OPO, even at the higher intensity.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

I claim:

1. A laser assembly to selectively emit laser radiation predominately at one of a first wavelength and a second wavelength, said assembly comprising:

first and second optical resonance cavities for stimulated radiation respectively of said first wavelength and said second wavelength;

a laser medium in said first cavity responsive to pumping means to emit radiation at said first wavelength;

a conversion medium in said second cavity, said conversion medium configured to convert radiation of said first wavelength to radiation at said second wavelength, said conversion occurring in response to said radiation at said first wavelength; and selectively operable dual mode means operative in relation to radiation of said first wavelength in a first mode to cause said assembly to emit laser radiation amplified in said first cavity and predominantly at said first wavelength, and in a second mode to cause said laser assembly to emit laser radiation amplified in said second cavity and predominantly at said second wavelength.

2. A laser assembly according to claim 1, wherein said dual mode means comprises an end mirror for said first cavity.

3. A laser cavity according to claim 2, wherein said dual mode means comprise a rotatable Porro prism, said prism being configured in said first mode to be retro-reflective to radiation of said first wavelength to cause generation of long pulse/low intensity radiation at said first wavelength in said first cavity, and said prism being rotatable as a conventional Q-switch in a second mode to cause generation of short pulse/high intensity radiation at said first wavelength in said first cavity.

4. A laser assembly according to claim 2, wherein the dual mode means comprises an optical switch including fully reflecting means and partially reflecting means, said switch being operable to respectively alternate said fully reflective means and said partially reflective means between adjacent optical paths to define said first cavity between the fully reflecting means and other said partially reflecting means via retroreflecting means.

5. A laser assembly according to claim 4, further comprising a beam mixer arranged to emit stimulated radiation of the respective wavelengths received on the respective optical paths.

6. A laser assembly according to claim 1, wherein said conversion medium is responsive to stimulated radiation emitted by said laser medium at said first wavelength having one or more prescribed characteristics selected for said conversion medium to emit radiation at said second wavelength, and wherein in response to the respective first and second modes of said dual mode means, radiation of said first wavelength respectively possesses and does not possess said prescribed characteristic.

7. A laser assembly according to claim 6, wherein the prescribed characteristic comprises a particular range of intensity of stimulated radiation.

8. A laser assembly according to claim 6, wherein in one of said modes, the dual mode means operates as a Q-switch.

9. A laser assembly according to claim 1, wherein said first cavity and said second cavity include a common volume.

10. A laser assembly according to claim 1, wherein said laser medium is Nd:YAG and the respective wavelengths are about 1.06 and about 1.54 μm.

11. A laser assembly according to claim 10, wherein said conversion medium is an optical parametric oscillator.

12. A laser assembly according to claim 11, wherein said oscillator includes active material having a threshold intensity for radiation of said first wavelength below which conversion to said second wavelength will essentially not occur.

13. A laser assembly according to claim 1, wherein said dual mode means includes at least one of a Pockels cell Q-switch, mode locking means and cavity dump means.

14. A laser assembly according to claim 1, further including detector means for detecting returned reflected or scattered radiation, and partially reflecting means to direct such returned radiation to the detector means after it has traversed said conversion medium.

15. A laser assembly according to claim 1, wherein said conversion medium is responsive to radiation at said first wavelength having an intensity in a predetermined range of intensity selected for said conversion medium to emit radiation at said second wavelength, and further including detector means for detecting returned externally reflected or scattered radiation, which radiation is of intensity outside said predetermined range whereby the conversion medium is not responsive to said returned radiation, and partially reflecting means to direct such returned radiation to the detector means after it has traversed said conversion medium.

16. A laser assembly according to claim 1, wherein the laser radiation of said first wavelength emitted by said assembly traverses said second cavity.

17. A laser assembly according to claim 16, further comprising window means through which laser radiation of said first and second wavelengths are respectively emitted from said assembly.

18. A laser assembly according to claim 17, wherein said window means is an end mirror for said second cavity.

19. A laser assembly according to claim 16, wherein said first and second cavities are arranged for the radiation of said first wavelength that is not converted to said second wavelength to be reflected to said first cavity for further amplification when said dual mode means is in said second mode.

20. A laser assembly according to claim 16, wherein said first and second cavities are arranged along a common optical axis.

21. A laser assembly according to claim 1, wherein said dual mode means comprise a prism mounted for rotation about an axis intersecting respective mutually orthogonal faces of the prism, wherein said prism includes means to define an internal retro-reflective corner in said prism.

22. A Q-switch device for laser systems comprising a prism mounted for rotation about an axis intersecting respec-
tive two mutually orthogonal faces of the prism which axis is alienable with a optical axis of the laser system, wherein said prism further includes an internal retro-reflective corner in said prism and a mounting to align the retro-reflective corner with the optical axis so as to form an internal corner-cube retroreflector.

23. A Q-switch device according to claim 22, wherein said prism includes a third face which is orthogonal to each of said mutually orthogonal faces.

24. A Q-switch device according to claim 22, further including means to alter orientation of the prism with respect to an optically resonant cavity whereby, selectively, amplified radiation generated in the cavity is momentarily reflected from the aforementioned mutually orthogonal faces as a short pulse/high intensity Q-switch mode, or is reflected by said retro-reflective corner as a long pulse/low intensity mode.

25. A laser apparatus, comprising a laser oscillator having a laser source and selectively operable dual mode means operable in a first mode in which laser radiation at a wavelength possesses one or more prescribed characteristics of intensity or pulse length selected to cause a conversion medium to emit radiation at a second wavelength, said dual operable means being operative in a second mode in which said laser radiation does not possess said characteristic and amplifier means to modify an output of the laser source to alter output between said modes.

26. A laser assembly to selectively emit laser radiation predominantly at one of a first wavelength and a second wavelength, said assembly comprising:

first and second optical resonance cavities for stimulated radiation respectively of said first wavelength and said second wavelength;

a laser medium in said first cavity responsive to pumping means to emit radiation at said first wavelength;

a conversion medium in said second cavity responsive to radiation of said first wavelength which radiation has an intensity in a predetermined range selected for said conversion medium to emit radiation at said second wavelength;

selectively operable dual mode means operative in relation to radiation of said first wavelength in a first mode to cause said assembly to emit laser radiation amplified in said first cavity and predominantly at said first wavelength, and in a second mode to cause said laser assembly to emit laser radiation amplified in said second cavity and predominantly at said second wavelength;

detector means for detecting returned externally reflected or scattered radiation, which radiation is of intensity outside said predetermined range, whereby the conversion medium is not responsive to said returned radiation; and partially reflecting means to direct such returned radiation to the detector means after is has traversed said conversion medium.

27. A laser assembly according to claim 26, wherein said first and second cavities include a common volume.

28. A laser assembly according to claim 26, wherein said laser medium is Nd:YAG and the respective wavelengths are about 1.06 and about 1.54 μm.

29. A laser assembly according to claim 26, wherein said radiation responsive means is an optical parametric oscillator.

30. A laser assembly according to claim 29, wherein said oscillator includes active material having a threshold intensity for radiation of said first wavelength, below which wavelength conversion will essentially not occur.

31. An optical assembly for use with laser radiation, comprising:

means responsive to laser radiation at one of a plurality of wavelengths having an intensity in a predetermined range of intensity selected for said responsive means to emit radiation in a given direction at another of said wavelengths;

detector means for detecting radiation at said other wavelength received from said direction of emission, which received radiation is of an intensity outside said range whereby the responsive means is not responsive to said received radiation at said other wavelength; and partially reflecting means to direct such received radiation to the detector means after it has traversed said radiation responsive means.

32. An assembly according to claim 31, wherein the respective wavelengths are about 1.06 and about 1.54 μm.

33. An assembly according to claim 31, wherein said radiation responsive means comprises an optical parametric oscillator.

34. An assembly according to claim 33, wherein said oscillator includes active material having a threshold intensity for laser radiation, below which wavelength conversion will essentially not occur.

* * * * *